United States Patent
You et al.

(10) Patent No.: US 10,560,979 B2
(45) Date of Patent: Feb. 11, 2020

(54) MEASUREMENT RESULT REPORTING METHOD, METHOD FOR COUNTING BY TIMER, APPARATUS, AND USER EQUIPMENT

(71) Applicant: HUAWEI TECHNOLOGIES CO., LTD., Shenzhen, Guangdong (CN)

(72) Inventors: Chunhua You, Shanghai (CN); Qufang Huang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/934,873

(22) Filed: Mar. 23, 2018

(65) Prior Publication Data
US 2018/0213594 A1    Jul. 26, 2018

Related U.S. Application Data

(63) Continuation of application No. PCT/CN2015/090791, filed on Sep. 25, 2015.

(51) Int. Cl.
*H04W 76/28* (2018.01)
*H04W 24/10* (2009.01)
(Continued)

(52) U.S. Cl.
CPC .......... *H04W 76/28* (2018.02); *H04W 24/10* (2013.01); *H04W 48/16* (2013.01);
(Continued)

(58) Field of Classification Search
None
See application file for complete search history.

(56) References Cited

U.S. PATENT DOCUMENTS

2014/0029459 A1    1/2014   Kwon et al.
2014/0355527 A1   12/2014   Vaidya et al.
(Continued)

FOREIGN PATENT DOCUMENTS

CN    102611525 A    7/2012
CN    102958060 A    3/2013
(Continued)

OTHER PUBLICATIONS

3GPP TSG-RAN WG2 Meeting #90 R2-152427,"Consideration on Measurement for LAA",ETRI,May 25-29, 2015, total 4 pages.
(Continued)

*Primary Examiner* — Xavier Szewai Wong
(74) *Attorney, Agent, or Firm* — Womble Bond Dickinson (US) LLP

(57) ABSTRACT

The present application discloses a measurement result reporting method, a method for controlling a discontinuous reception (DRX) timer to count, an apparatus, and user equipment. The measurement result reporting method includes: receiving, by user equipment, a measurement configuration of an unlicensed spectrum cell sent by a base station, where the measurement configuration includes a trigger condition, an average signal strength, and a signal strength related time ratio; and sending, by the user equipment, a measurement result of the average signal strength and the signal strength related time ratio to the base station when at least one of the average signal strength or the signal strength related time ratio satisfies the trigger condition.

6 Claims, 7 Drawing Sheets

---

User equipment receives a measurement configuration of an unlicensed spectrum cell sent by a base station, where the measurement configuration includes a trigger condition, an average signal strength, and a signal strength related time ratio — S100

The user equipment sends a measurement result of the average signal strength and the signal strength related time ratio to the base station when at least one of the average signal strength or the signal strength related time ratio meets the trigger condition — S101

(51) Int. Cl.
*H04W 48/16* (2009.01)
*H04W 72/04* (2009.01)
*H04W 88/06* (2009.01)
*H04W 88/02* (2009.01)

(52) U.S. Cl.
CPC ......... *H04W 72/042* (2013.01); *H04W 88/06* (2013.01); *H04W 88/023* (2013.01)

(56) References Cited

U.S. PATENT DOCUMENTS

| | | |
|---|---|---|
| 2015/0195763 A1 | 7/2015 | Chen et al. |
| 2015/0296516 A1* | 10/2015 | Jung ..................... H04W 72/02 370/312 |
| 2016/0227427 A1* | 8/2016 | Vajapeyam ......... H04W 72/085 |
| 2016/0302230 A1* | 10/2016 | Novlan ................ H04B 17/318 |
| 2016/0337101 A1 | 11/2016 | Gao et al. |
| 2017/0048738 A1* | 2/2017 | Wang .................... H04W 24/10 |
| 2017/0078997 A1* | 3/2017 | Dinan ............... H04W 56/0015 |
| 2017/0142746 A1* | 5/2017 | Koorapaty ............ H04W 16/14 |
| 2017/0289818 A1* | 10/2017 | Ng ........................ H04W 48/12 |
| 2018/0175975 A1* | 6/2018 | Um ....................... H04L 1/1816 |
| 2018/0184317 A1* | 6/2018 | Li ........................... H04W 24/10 |

FOREIGN PATENT DOCUMENTS

| | | |
|---|---|---|
| CN | 104602267 A | 5/2015 |
| CN | 104796218 A | 7/2015 |
| EP | 2782409 A1 | 9/2014 |
| EP | 3079436 A1 | 10/2016 |
| WO | 2016163656 A1 | 10/2016 |
| WO | 2016163665 A1 | 10/2016 |
| WO | 2016182738 A1 | 11/2016 |

OTHER PUBLICATIONS

3GPP TSG RAN WG2 Meeting #91 R2-153126,"LAA Measurements and carrier selection procedure",Sony,Aug. 24-28, 2015,total 3 pages.
3GPP TSG RAN WG2 #91 R2-153429,"RSSI Measurement for LA",ETRI,Aug. 24-28, 2015,total 4 pages.
3GPP TSG-RAN WG2 Meeting #91 R2-153985,"CR to capture LAA agreements",Huawei, HiSilicon,Change Request 36.300 CR 0787,Current version:13.0.0,Aug. 24-28, 2015,total 9 pages.
Huawei, HiSilicon:"Scheduling design for LAA", 3GPP TSG RAN WG1 meeting #82, R1-154346. Beijing, China, Aug. 24-28, 2015. total 5 pages. XP051001662.
Nokia Corporation, Nokia Networks:"Overview of possible LAA impact to RAN2", 3GPP TSG-RAN WG2 Meeting #89, R2-150188, Athens, Greece, Feb. 9-13, 2015. total 8 pages. XP050935534.

* cited by examiner

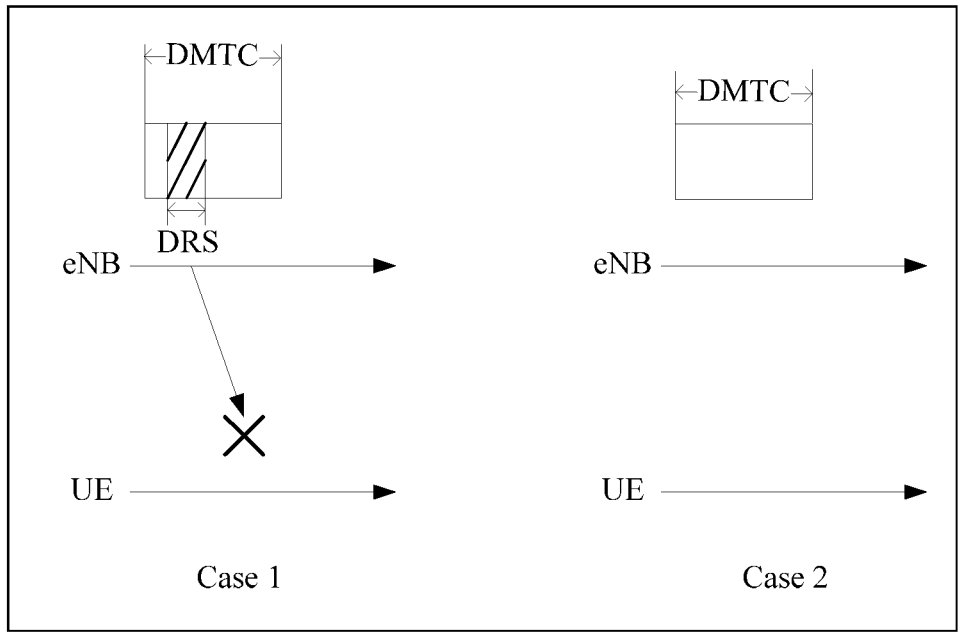

FIG. 3

```
┌─────────────────────────────────────────────────────────┐
│ User equipment obtains a subframe K1 of a licensed      │
│ spectrum cell and a subframe K2 of an unlicensed        │ ─── S400
│ spectrum cell, where the subframe K2 includes a         │
│ subframe K3, and duration of K3 is shorter              │
│ than duration of K1                                     │
└─────────────────────────────────────────────────────────┘
                            ▼
┌─────────────────────────────────────────────────────────┐
│ The user equipment determines, in the subframe K1 and   │
│ the subframe K2, a subframe meeting a preset condition  │ ─── S401
│ as a physical downlink control channel PDCCH-subframe,  │
│ where the PDCCH-subframe includes K1 and/or K2          │
└─────────────────────────────────────────────────────────┘
                            ▼
┌─────────────────────────────────────────────────────────┐
│ The user equipment controls, based on the PDCCH-        │
│ subframe, a discontinuous reception DRX timer to count  │ ─── S402
└─────────────────────────────────────────────────────────┘
```

FIG. 4

MEASUREMENT RESULT REPORTING METHOD, METHOD FOR COUNTING BY TIMER, APPARATUS, AND USER EQUIPMENT

CROSS-REFERENCE TO RELATED APPLICATIONS

This application is a continuation of International Application No. PCT/CN2015/090791, filed on Sep. 25, 2015, the disclosure of which is hereby incorporated by reference in its entirety.

TECHNICAL FIELD

The present invention relates to the field of communications technologies, and in particular, to a measurement result reporting method, a method for controlling a DRX (discontinuous reception) timer to count, an apparatus, and user equipment.

BACKGROUND

In an LTE (Long Term Evolution) system, to increase data transmission efficiency, an eNB (evolved Node B, evolved NodeB) needs to configure a suitable serving cell for UE (user equipment).

With popularity of mobile devices and a surge of mobile data traffic and wired network traffic, operators have an increasing pressure on network capacities. In addition, a shortage of spectrum resources becomes increasingly severe. Therefore, an LTE-U (LTE-Unlicensed) technology emerges. For example, in LTE, an unlicensed cell uses an unlicensed spectrum. How the unlicensed cell provides a service for UE is a problem to be resolved urgently in the industry.

SUMMARY

Embodiments of the present invention provide a measurement result reporting method, a method for controlling a DRX timer to count, an apparatus, and user equipment, so as to enable an unlicensed cell to provide a service for UE.

To resolve the foregoing technical problem, a first aspect of the present invention provides a measurement result reporting method, including:

receiving, by user equipment, a measurement configuration of an unlicensed spectrum cell sent by a base station, where the measurement configuration includes a trigger condition, an average signal strength, and a signal strength related time ratio; and sending, by the user equipment, a measurement result of the average signal strength and the signal strength related time ratio to the base station when at least one of the average signal strength or the signal strength related time ratio satisfies the trigger condition.

According to one embodiment, the measurement configuration further includes a discovery signal measurement timing configuration (DMTC), and the measurement result further includes a time window ratio; and before the sending, by the user equipment, a measurement result to the base station, the method further includes:

obtaining, by the user equipment, the time window ratio, where the time window ratio is a ratio of a quantity of DMTCs measured by the user equipment and for which a discovery reference signal (DRS) of the unlicensed spectrum cell is obtained to a quantity of the DMTCs measured by the user equipment.

According to one embodiment, the trigger condition includes at least one of the following:

a signal quality of the unlicensed spectrum cell is greater than a first signal quality threshold;

a signal quality of the unlicensed spectrum cell is less than a second signal quality threshold;

a signal quality of a neighboring cell is greater than a third signal quality threshold;

a signal quality of the neighboring cell is greater than a signal quality of the unlicensed spectrum cell, and a difference between the signal quality of the neighboring cell and the signal quality of the unlicensed spectrum cell is greater than a fourth signal quality threshold;

a channel resource quality of the unlicensed spectrum cell is greater than a first channel resource quality threshold; or a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

According to one, the average signal strength is an average value of signal strengths of the unlicensed spectrum cell that are measured by the user equipment; and the signal strength related time ratio is a ratio of a total time corresponding to signal strengths that are greater than or equal to a first strength threshold to a measurement time of the user equipment for the unlicensed spectrum cell.

According to one embodiment of the present invention, the UE measures the average signal strength and the signal strength related time ratio according to the measurement configuration of the unlicensed spectrum cell sent by the base station. If the average signal strength and/or the signal strength related time ratio satisfies the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station configures the unlicensed spectrum cell for the UE, the unlicensed spectrum cell can provide a service for the UE.

A second aspect of the present invention provides a method for controlling a DRX timer to count, the method including:

obtaining, by user equipment, a subframe K1 of a licensed spectrum cell and a subframe K2 of an unlicensed spectrum cell, where the subframe K2 includes a subframe K3, and a duration of K3 is shorter than a duration of K1;

determining, by the user equipment in the subframe K1 and the subframe K2, a subframe satisfying a preset condition as a physical downlink control channel (PDCCH)-subframe, where the PDCCH-subframe includes subframe K1 and/or subframe K2; and controlling, based on the PDCCH-subframe by the user equipment, a DRX timer to count.

According to one embodiment, determining, by the user equipment in the subframe K1 and the subframe K2, a subframe satisfying a preset condition as a PDCCH-subframe includes:

determining, by the user equipment, a subframe that is a special subframe or a downlink subframe in the subframe K1 and the subframe K2 as the PDCCH-subframe, where the special subframe includes a subframe for uplink transmission or downlink transmission by means of time division.

According to another embodiment, determining, by the user equipment in the subframe K1 and the subframe K2, a subframe satisfying a preset condition as a PDCCH-subframe includes:

when the subframe K2 has a subframe K4 and the subframe K4 is both a downlink subframe and a floating subframe, obtaining, by the user equipment, a subframe K5 from the subframe K1, where a difference between absolute values of a subframe start time of the subframe K5 and the subframe K4 is less than the duration of K1; and determining, by the user equipment, the subframe K5 as the PDCCH-subframe.

According to another embodiment, a duration of the floating subframe is equal to the duration of K1, and subframe start time of the floating subframe is selectively aligned with a subframe start time of K1.

According to one embodiment, the UE determines, in the received subframe K1 of the licensed spectrum cell and the received subframe K2 of the unlicensed spectrum cell, that the subframe satisfies the preset condition as the PDCCH-subframe, where the subframe K2 includes the subframe K3, and the duration of K3 is shorter than the duration of K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing the efficiency of identifying downlink data by the UE, and increasing a data transmission rate of the unlicensed spectrum cell. Therefore, the unlicensed spectrum cell can provide a better downlink service for the UE.

A third aspect of the present invention provides a measurement apparatus, including:

a receiving module, configured to receive a measurement configuration of an unlicensed spectrum cell sent by a base station, where the measurement configuration includes a trigger condition, an average signal strength, and a signal strength related time ratio; and a sending module, configured to send a measurement result of the average signal strength and the signal strength related time ratio to the base station when at least one of the average signal strength or the signal strength related time ratio meets the trigger condition.

According to one embodiment, the measurement configuration further includes a DMTC, and the measurement result further includes a time window ratio; and the measurement apparatus further includes:

an obtaining module, configured to obtain the time window ratio, where the time window ratio is a ratio of a quantity of DMTCs measured by the measurement apparatus and for which a discovery reference signal DRS of the unlicensed spectrum cell is obtained to a quantity of the DMTCs measured by the measurement apparatus.

According to one embodiment, the trigger condition includes at least one of the following:

a signal quality of the unlicensed spectrum cell is greater than a first signal quality threshold;

a signal quality of the unlicensed spectrum cell is less than a second signal quality threshold;

a signal quality of a neighboring cell is greater than a third signal quality threshold;

a signal quality of the neighboring cell is greater than a signal quality of the unlicensed spectrum cell, and a difference between the signal quality of the neighboring cell and the signal quality of the unlicensed spectrum cell is greater than a fourth signal quality threshold;

a channel resource quality of the unlicensed spectrum cell is greater than a first channel resource quality threshold; or a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

According to one embodiment, the average signal strength is an average value of signal strengths of the unlicensed spectrum cell that are measured by the measurement apparatus; and the signal strength related time ratio is a ratio of a total time corresponding to signal strengths that are greater than or equal to a first strength threshold to a measurement time of the measurement apparatus for the unlicensed spectrum cell.

A fourth aspect of the present invention provides user equipment, where the user equipment includes a communications bus, an input device, an output device, and a processor, where the communications bus is configured to implement a connection and communication between the input device, the output device, and the processor;

the input device is configured to receive a measurement configuration of an unlicensed spectrum cell sent by a base station, where the measurement configuration includes a trigger condition, an average signal strength, and a signal strength related time ratio; and the output device is configured to send a measurement result of the average signal strength and the signal strength related time ratio to the base station when at least one of the average signal strength or the signal strength related time ratio satisfies the trigger condition.

According to one embodiment, the measurement configuration further includes a DMTC, and the measurement result further includes a time window ratio; and the processor is configured to:

obtain the time window ratio, where the time window ratio is a ratio of a quantity of DMTCs measured by the processor for which a discovery reference signal DRS of the unlicensed spectrum cell is obtained to a quantity of the DMTCs measured by the processor.

According to one embodiment, the trigger condition includes at least one of the following:

a signal quality of the unlicensed spectrum cell is greater than a first signal quality threshold;

a signal quality of the unlicensed spectrum cell is less than a second signal quality threshold;

a signal quality of a neighboring cell is greater than a third signal quality threshold;

a signal quality of the neighboring cell is greater than a signal quality of the unlicensed spectrum cell, and a difference between the signal quality of the neighboring cell and the signal quality of the unlicensed spectrum cell is greater than a fourth signal quality threshold;

a channel resource quality of the unlicensed spectrum cell is greater than a first channel resource quality threshold; or a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

According to one embodiment, the average signal strength is an average value of signal strengths of the unlicensed spectrum cell that are measured by the processor; and the signal strength related time ratio is a ratio of a total time corresponding to signal strengths that are greater than or equal to a first strength threshold to a measurement time of the processor for the unlicensed spectrum cell.

According to one embodiment of the present invention, the UE measures the average signal strength and the signal strength related time ratio according to the measurement configuration of the unlicensed spectrum cell sent by the base station. If the average signal strength and/or the signal strength related time ratio satisfies the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station determines to configure the unlicensed spectrum cell for the UE, the unlicensed spectrum cell can provide a service for the UE.

A fifth aspect of the present invention provides an apparatus for controlling a DRX timer to count, the apparatus including:

an obtaining module, configured to obtain a subframe K1 of a licensed spectrum cell and a subframe K2 of an unlicensed spectrum cell, where the subframe K2 includes a subframe K3, and a duration of K3 is shorter than a duration of K1;

a determining module, configured to determine, in the subframe K1 and the subframe K2 obtained by the obtaining module, a subframe satisfying a preset condition as a PDCCH-subframe, where the PDCCH-subframe includes K1 and/or K2; and a control module, configured to control, based on the PDCCH-subframe determined by the determining module, a DRX timer to count.

According to one embodiment, the determining module is specifically configured to:

determine a subframe that is a special subframe or a downlink subframe in the subframe K1 and the subframe K2 as the PDCCH-subframe, where the special subframe includes a subframe for uplink transmission or downlink transmission by means of time division.

According to one embodiment, the obtaining module is specifically configured to:

when the subframe K2 has a subframe K4 and the subframe K4 is both a downlink subframe and a floating subframe, obtain a subframe K5 from the subframe K1, where a difference between absolute values of subframe start time of the subframe K5 and the subframe K4 is less than the duration of K1; and the determining module is specifically configured to:
determine the subframe K5 as the PDCCH-subframe.

According to one embodiment, a duration of the floating subframe is equal to the duration of K1, and a subframe start time of the floating subframe is selectively aligned with a subframe start time of K1.

A sixth aspect of the present invention provides user equipment, where the user equipment includes a communications bus, a memory, and a processor, where the communications bus is configured to implement a connection and communication between the memory and the processor; and the memory stores a set of program code, and the processor invokes the program code stored in the memory to perform the following operations:

obtaining a subframe K1 of a licensed spectrum cell and a subframe K2 of an unlicensed spectrum cell, where the subframe K2 includes a subframe K3, and a duration of subframe K3 is shorter than a duration of subframe K1;

determining, in the subframe K1 and the subframe K2, a subframe satisfying a preset condition as a PDCCH-subframe, where the PDCCH-subframe includes subframe K1 and/or subframe K2; and controlling, based on the PDCCH-subframe, a discontinuous reception DRX timer to count.

According to one embodiment, when performing the determining, in the subframe K1 and the subframe K2, a subframe satisfying a preset condition as a PDCCH-subframe, the processor is specifically configured to:

determine a subframe that is a special subframe or a downlink subframe in the subframe K1 and the subframe K2 as the PDCCH-subframe, where the special subframe includes a subframe for uplink transmission or downlink transmission by means of time division.

According to one embodiment, when performing the determining, in the subframe K1 and the subframe K2, a subframe meeting a preset condition as a physical downlink control channel PDCCH-subframe, the processor is specifically configured to:

when the subframe K2 has a subframe K4 and the subframe K4 is both a downlink subframe and a floating subframe, obtain a subframe K5 from the subframe K1, where a difference between absolute values of a subframe start time of the subframe K5 and the subframe K4 is less than the duration of K1; and designate the subframe K5 as the PDCCH-subframe.

According to one embodiment, a duration of the floating subframe is equal to the duration of subframe K1, and a subframe start time of the floating subframe is selectively aligned with a subframe start time of subframe K1.

According to one embodiment of the present invention, the UE determines, in the received subframe K1 of the licensed spectrum cell and the received subframe K2 of the unlicensed spectrum cell, the subframe satisfying the preset condition as the PDCCH-subframe, where the subframe K2 includes the subframe K3, and the duration of K3 is shorter than the duration of K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing efficiency of identifying downlink data by the UE, and increasing a data transmission rate of the unlicensed spectrum cell. Therefore, the unlicensed spectrum cell can provide a better downlink service for the UE.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is a schematic diagram of sending a DMTC by a base station in the another embodiment of the measurement result reporting method according to the embodiments of the present invention;

FIG. 4 is a schematic flowchart of an embodiment of a method for controlling a discontinuous reception DRX timer to count according to the embodiments of the present invention;

DESCRIPTION OF EMBODIMENTS

Figure 1:
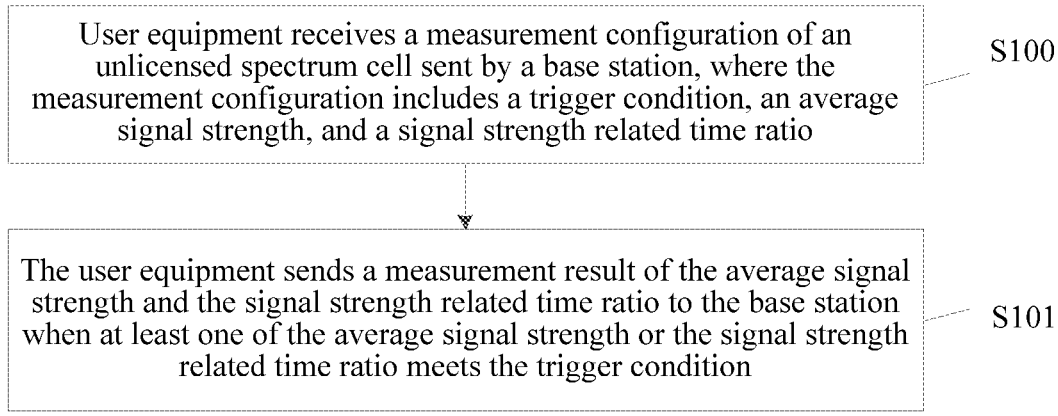
FIG. 1 is a schematic flowchart of an embodiment of a measurement result reporting method according to the embodiments of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a measurement result reporting method, a method for controlling a DRX timer to count, an apparatus, and user equipment, so as to enable an unlicensed cell to provide a service for UE.

For a licensed cell, a base station sends a DRS to UE. The UE obtains an RSRP (reference signal received power) and an RSRQ (reference signal received quality) according to the received DRS, and then reports the RSRP and the RSRQ to the base station when a periodic trigger is met and when the RSRP and the RSRQ meet a reported event trigger. The base station allocates a serving cell to the UE according to the RSRP and the RSRQ that are reported by the UE. A process of obtaining the RSRP and the RSRQ by the UE is RRM (radio resource management) measurement. The RSRP is an average power (not including a CP (cyclic prefix) power on each resource unit obtained by the user equipment by finding, within a measurement bandwidth, corresponding CRS (cell-specific pilot) locations at an antenna port (Port 0) and by computing an average strength of CRS signals at the locations.

All operators can use an unlicensed spectrum, and reference signal sequences of different cells as well as specific resource locations for the reference signal sequences may be different. In this case, whether a channel is in an idle state or a busy state cannot be determined and a hidden node cannot be differentiated only by measuring RSRP and RSRQ of a cell. Therefore, according to the embodiments of the present invention, a measurement result of an average signal strength and a signal strength related time ratio is obtained by measurement, and the average signal strength and the signal strength related time ratio of an unlicensed spectrum cell are reported to an eNB. The eNB determines whether to configure the unlicensed spectrum cell for UE.

For example, in various embodiments of the present invention, UE obtains a measurement result of an average signal strength and a signal strength related time ratio by measuring an RSSI (received signal strength indicator). The RSSI is an average value of powers of all signals (including a pilot signal, a data signal, an unlicensed spectrum cell signal, an interference signal of a neighboring cell of an unlicensed spectrum cell, a noise signal, and the like) measured at the CRS locations described above in an LTE system. The following details a process of providing a service for UE by an LTE-U cell (unlicensed spectrum cell). In the embodiments of the present invention, the LTE-U cell may be an LAA (license assisted access) cell or may be a standalone LAA cell. For example, the LAA cell needs to perform carrier aggregation with a licensed spectrum cell to provide a service for the UE, while the standalone LAA cell can independently provide a service for the UE.

It should be understood that, the technical solutions of the embodiments of the present invention may be applied to various communications systems, such as a Global System for Mobile Communications (GSM) system, a Code Division Multiple Access (CDMA) system, a Wideband Code Division Multiple Access (WCDMA) system, an LTE system, an LTE frequency division duplex (FDD) system, an LTE time division duplex (TDD), a Universal Mobile Telecommunications System (UMTS), and a future 5G communications system.

It should be understood that in the embodiments of the present invention, a terminal device (Terminal Equipment) may be referred to as user equipment, a mobile station (MS), a mobile terminal, and the like. The user equipment may communicate with one or more core networks by using a radio access network (RAN). For example, the user equipment may be a mobile phone (also referred to as a "cellular" phone) or a computer with a mobile terminal. For example, the mobile terminal may be a portable, pocket-sized, hand-held, computer built-in, or in-vehicle mobile apparatus, a terminal device in a future 5G network, a terminal device in a future evolved PLMN network, or the like.

It should be further understood that in the embodiments of the present invention, a network device may be a device configured to communicate with user equipment. The network device may be a base transceiver station (BTS) in a GSM system or a CDMA system, may be a NodeB (NB, NodeB) in a WCDMA system, or may be an eNodeB in an LTE system. Alternatively, the network device may be a relay station, an access point, an in-vehicle device, a wearable device, a network-side device in a future 5G network, a network device in a future evolved PLMN network, or the like.

Referring to FIG. 1, FIG. 1 is a schematic flowchart of an embodiment of a measurement result reporting method according to the embodiments of the present invention. For example, UE may be a mobile phone, a tablet computer, a notebook computer, a palmtop computer, a mobile Internet device (MID), a wearable device (such as a smartwatch (for example, an Apple Watch), a smart band, or a pedometer), or another terminal device that can communicate with a base station by using an unlicensed spectrum cell.

As shown in FIG. 1, the embodiment of the measurement result reporting method according to the embodiments of the present invention may include the following operations.

In operation S100, UE receives a measurement configuration of an unlicensed spectrum cell sent by a base station, where the measurement configuration includes a trigger condition, an average signal strength, and a signal strength related time ratio.

During specific implementation, the UE receives a measurement configuration of the unlicensed spectrum cell sent by the base station. The measurement configuration may be generated by the base station according to a service requirement or a channel status of the unlicensed spectrum cell, and the measurement configuration includes a trigger condition, an average signal strength, and a signal strength related time ratio. In this case, the UE measures the average signal strength and the signal strength related time ratio of the unlicensed spectrum cell according to the measurement configuration.

Optionally, the UE receives a measurement configuration of the unlicensed spectrum cell sent by D2D (device-to-device) user equipment. The measurement configuration includes a trigger condition, an average signal strength, and a signal strength related time ratio. In this case, the UE measures the average signal strength and the signal strength related time ratio of the unlicensed spectrum cell according to the measurement configuration.

Optionally, the measurement configuration may include at least one of a measurement indicator of the average signal strength, a measurement indicator of the signal strength related time ratio, or the trigger condition. In this case, the UE measures at least one of the average signal strength or the signal strength related time ratio of the unlicensed spectrum cell according to the measurement configuration.

In operation S01, the user equipment sends a measurement result of the average signal strength and the signal strength related time ratio to the base station when at least one of the average signal strength or the signal strength related time ratio meets the trigger condition.

During specific implementation, the UE may obtain the trigger condition, and the trigger condition may be an event trigger reported by the UE and/or a periodic trigger. If the UE determines that the average signal strength and/or the signal strength related time ratio meets an event-triggered condition, the UE sends the measurement result of the average signal strength and the signal strength related time ratio of the unlicensed spectrum cell to the base station. After receiving the measurement result of the average signal strength and the signal strength related time ratio of the unlicensed spectrum cell that is sent by the UE, the base station determines whether to configure the unlicensed spectrum cell for the UE.

Optionally, the UE measures at least one of the average signal strength or the signal strength related time ratio of the unlicensed spectrum cell according to the measurement configuration. If a measurement result meets the trigger condition, the UE sends the measurement result to the base station or the user equipment.

In an implementable manner, the UE may obtain the trigger condition according to the measurement configuration or obtain the trigger condition by using a message additionally sent by the base station.

In an implementable manner, when the UE determines that the average signal strength and/or the signal strength related time ratio meets a time indicated by means of an event trigger or a periodic trigger, the UE sends the measurement result to the base station.

According to one embodiment of the present invention, the UE measures the average signal strength and the signal strength related time ratio according to the measurement configuration of the unlicensed spectrum cell sent by the base station. If the average signal strength and/or the signal strength related time ratio meets the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station determines to configure the unlicensed spectrum cell for the UE, the unlicensed spectrum cell can provide a service for the UE.

Figure 2:
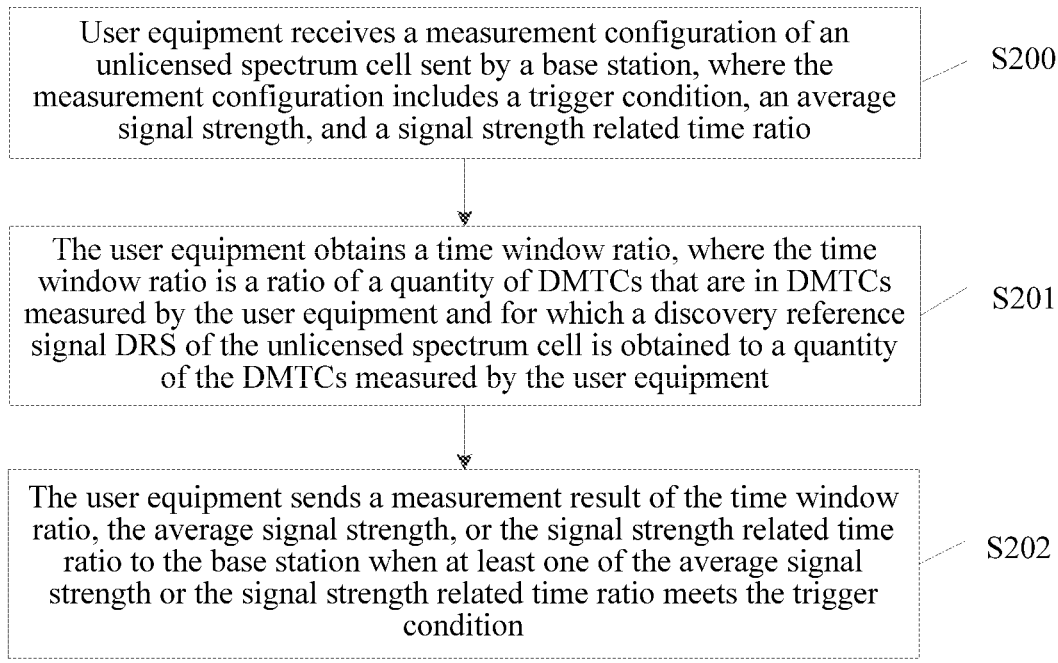
FIG. 2 is a schematic flowchart of another embodiment of a measurement result reporting method according to the embodiments of the present invention.

Referring to FIG. 2, FIG. 2 is a schematic structural diagram of an embodiment of a measurement result reporting method according to the embodiments of the present invention. Based on the embodiment of FIG. 1, this embodiment of the present invention provides detailed descriptions about a process of measuring an average signal strength and a signal strength related time ratio.

As shown in FIG. 2, another embodiment of the measurement result reporting method according to the embodiments of the present invention may include the following operations.

In operation 200, UE receives a measurement configuration of an unlicensed spectrum cell sent by a base station, where the measurement configuration includes a trigger condition, an average signal strength, and a signal strength related time ratio.

Optionally, the measurement configuration includes a measurement indicator of the average signal strength and a measurement indicator of the signal strength related time ratio. In this case, the user equipment may obtain the trigger condition by using a message sent by the base station.

Optionally, the measurement configuration includes the trigger condition, a measurement indicator of the average signal strength, and a measurement indicator of the signal strength related time ratio.

During specific implementation, the average signal strength is an average value of signal strengths of the unlicensed spectrum cell that are measured by the user equipment. The average value of the signal strengths may be understood as an average RSSI, and the signal strengths include at least one signal strength of the unlicensed spectrum cell measured by the user equipment. For example, the user equipment may measure the signal strengths of the unlicensed spectrum cell at a preset time interval. Specifically, the average RSSI may be obtained in the following manners. A physical layer measures the average RSSI (a measurement process of the average RSSI is referred to as layer 1 filtering). Alternatively, average RSSI measurement may be performed in a manner similar to existing measurement of RSRP and RSRQ, that is, a physical layer measures the average RSSI (layer 1 filtering), and then an RRC layer performs filtering and smoothing on the average RSSI (a processing process of the average RSSI is referred to as layer 3 filtering).

Specifically, the average RSSI may be obtained by the user equipment according to a signal strength of the unlicensed spectrum cell measured within a DMTC window, may be obtained by the user equipment according to signal strengths of the unlicensed spectrum cell measured within multiple DMTC windows, or may be obtained by the user equipment according to an average value of signal strengths measured within multiple DMTC windows. Herein, the user equipment measures strengths of all signals at an unlicensed spectrum, and the signals include a signal of the unlicensed spectrum cell and a WiFi signal working at the spectrum, and further include a signal of another system. Provided that a signal works at the unlicensed spectrum, the signal falls within a measurement range. Specifically, the measurement configuration further includes a measurement frequency. The base station may allocate at least one trigger condition, that is, an event trigger, and each event trigger may correspond to a corresponding frequency by using a measurement ID (identification or identifier). Therefore, the UE may obtain the measurement frequency from the received measurement configuration of the unlicensed spectrum cell, measure signal strengths of the unlicensed spectrum cell according to the measurement frequency, and obtain an average value of the signal strengths, thereby obtaining the average signal strength of the unlicensed spectrum cell.

In an optional implementation, according to one embodiment, the UE may obtain, according to the received measurement configuration of the unlicensed spectrum cell, a DMTC corresponding to the measurement frequency, and measure signal strengths of the unlicensed spectrum cell within a time indicated by the DMTC, for example, may measure the signal strengths of the unlicensed spectrum cell at a preset time interval. The measured signal strengths of the unlicensed spectrum cell may include a signal strength of a DRS of the unlicensed spectrum cell, or may not include a signal strength of a DRS of the unlicensed spectrum cell.

In one embodiment, the signal strength related time ratio is a ratio of a total time corresponding to signal strengths that are in the signal strengths and that are greater than or equal to a first strength threshold to a measurement time of the user equipment for the unlicensed spectrum cell. Specifically, after obtaining the signal strengths of the unlicensed spectrum cell, the UE obtains signal strengths that are in the signal strengths and that are greater than or equal to the first strength threshold, obtains a total time for the signal strengths greater than or equal to the first strength threshold, and finally obtains the signal strength related time ratio according to a ratio of the total time for the signal strengths greater than or equal to the first strength threshold to a measurement time of the user equipment for the unlicensed spectrum cell. For example, the signal strengths of the unlicensed spectrum cell may be measured at a preset time interval. Specifically, the signal strength related time ratio may be obtained by the user equipment according to a signal strength of the unlicensed spectrum cell measured within a DMTC window, may be obtained by the user equipment according to signal strengths of the unlicensed spectrum cell measured within multiple DMTC windows, or may be obtained by the user equipment according to an average value of channel strength related time ratios measured within multiple DMTC windows. In an implementable manner, the UE may compute the signal strength related time ratio, or may compute the signal strength related time ratio by using an independent device having a computing capability.

In operation 201, the user equipment obtains the time window ratio, where the time window ratio is a ratio of a quantity of DMTCs that are in DMTCs measured by the user equipment and for which a DRS of the unlicensed spectrum cell is obtained to a quantity of the DMTCs measured by the user equipment.

In one embodiment, the measurement configuration further includes a DMTC. The user equipment obtains the quantity $N_{DMTC}$ of the DMTCs measured by the user equipment, and the quantity $N_{DMTC\_valid}$ of the DMTCs that are in the DMTCs measured by the user equipment and for which the DRS of the unlicensed spectrum cell is obtained. $N_{DMTC}$ indicates a quantity of all DMTCs that are sent by the base station and that are measured by the UE, and $N_{DMTC\_valid}$ indicates a quantity of DMTCs that are in all the received DMTCs and for which the UE can obtain the DRS of the unlicensed spectrum cell.

In one embodiment, to learn a channel quality of the unlicensed spectrum cell, the user equipment may compute the time window ratio of the unlicensed spectrum cell. Specifically, as shown in FIG. 3, for example, in case 1, a DMTC sent by the base station to the UE includes a DRS, and the UE may measure multiple signal strengths of the unlicensed spectrum cell by using the received DRS. However, due to a poor channel quality of the unlicensed spectrum cell, the UE cannot obtain the DRS, and cannot measure a signal strength in the DMTC either. For another example, in case 2, a DMTC sent by the base station to the UE does not include a DRS. Consequently, similarly the UE cannot obtain a DRS, and cannot measure a signal strength in the DMTC either. To distinguish between the foregoing two cases, the UE needs to calculate $N_{DMTC\_valid}$ and $N_{DMTC}$, so as to obtain the time window ratio by computing a ratio of $N_{DMTC\_valid}$ to $N_{DMTC}$, that is, $P=N_{DMTC\_valid}/N_{DMTC}$.

In operation 202, the user equipment sends a measurement result of the time window ratio, the average signal strength, or the signal strength related time ratio to the base station when at least one of the average signal strength or the signal strength related time ratio meets the trigger condition.

During specific implementation, the UE may obtain the trigger condition, and the trigger condition may be an event trigger reported by the UE and/or a periodic trigger. The event trigger may include any one of Event A1, Event A2, Event A4, Event A6, Event C1, or Event C2. A report condition of each event trigger may be as follows:

Event A1: A signal quality of the unlicensed spectrum cell is greater than or equal to a first signal quality threshold.

Event A2: A signal quality of the unlicensed spectrum cell is less than or equal to a second signal quality threshold.

Event A4: A signal quality of a neighboring cell is greater than or equal to a third signal quality threshold.

Event A6: A signal quality of the neighboring cell is greater than or equal to the signal quality of the unlicensed spectrum cell, and a difference between the signal quality of the neighboring cell and the signal quality of the unlicensed spectrum cell is greater than or equal to a fourth signal quality threshold.

Event C1: A channel resource quality of the unlicensed spectrum cell is greater than or equal to a first channel resource quality threshold.

Event C2: A channel resource quality of the unlicensed spectrum cell is greater than or equal to a second channel resource quality threshold, and a difference between the channel resource quality of the unlicensed spectrum cell and the second channel resource quality threshold is greater than or equal to a third channel resource quality threshold.

The foregoing related thresholds for the event triggers are configured by the base station according to an air interface status of a cell and an amount of data of the UE, and may be carried in the measurement configuration of the unlicensed spectrum cell sent by the base station to the UE. For example, for Event A1, if the UE has a large amount of data but the unlicensed spectrum cell is relatively heavily loaded, the base station may configure a relatively high trigger threshold for limiting trigger reporting of the UE. The foregoing related neighboring cell may be a licensed spectrum cell, or may be an unlicensed spectrum cell. The neighboring cell and the unlicensed spectrum cell may belong to a same base station, or may belong to different base stations.

In one embodiment, Event A1 is used as an example of a trigger condition for the purpose of illustration. The trigger condition of Event A1 is that the signal quality of the unlicensed spectrum cell is greater than the first signal quality threshold. For example, the base station may configure the first signal quality threshold (including an average signal strength threshold and a signal strength related time ratio threshold), a hysteresis value of the average signal strength, and a hysteresis value of the signal strength related time ratio in the measurement configuration. If a difference between the average signal strength obtained by the UE and the hysteresis value of the average signal strength is greater than the average signal strength threshold, or a difference between the signal strength related time ratio and the hysteresis value of the signal strength related time ratio is greater than the signal strength related time ratio threshold, the UE sends a measurement result to the base station. The measurement result includes at least one of the average signal strength, the signal strength related time ratio, or the time window ratio.

In one embodiment, different thresholds may be configured for same event trigger. As shown in Table 1, a first case of Event A1 may indicate an excellent channel quality, where the average signal strength threshold and the signal strength related time ratio threshold are $N_{11}$ and $N_{12}$ respectively; a second case of Event A1 may indicate a good channel quality, where the average signal strength threshold and the signal strength related time ratio threshold are $N_{21}$ and $N_{22}$ respectively; and a third case of Event A1 may indicate a poor channel quality, where the average signal strength threshold and the signal strength related time ratio threshold are $N_{31}$ and $N_{32}$ respectively. The UE may send the measurement result of the unlicensed spectrum cell to the base station when the UE measures that the average signal strength and the signal strength related time ratio meet a trigger condition of any one of the cases. The base station may learn the channel quality of the unlicensed spectrum cell according to the received measurement result. When the base station receives measurement results of multiple unlicensed spectrum cells sent by the UE, if the base station overstocks a relatively large amount of data of the UE, the base station may configure an unlicensed spectrum cell having an optimal channel quality for the UE according to obtained channel qualities of the unlicensed spectrum cells. For example, the UE separately sends measurement results of an unlicensed spectrum cell A and an unlicensed spectrum cell B to the base station. If the measurement result of the unlicensed spectrum cell A meets the first case of Event A1, and the measurement result of the unlicensed spectrum cell B meets the second case of Event A1, it indicates that a channel quality of the unlicensed spectrum cell A is higher than a channel quality of the unlicensed spectrum cell B. In this case, the base station may choose to configure the unlicensed spectrum cell A for the UE.

| Event A1 | Average signal strength threshold | Signal strength related time ratio threshold |
|---|---|---|
| 1 | $N_{11}$ | $N_{12}$ |
| 2 | $N_{21}$ | $N_{22}$ |
| 3 | $N_{31}$ | $N_{32}$ |

In an implementable manner, the UE may obtain the trigger condition according to the measurement configuration or obtain the trigger condition by using a message additionally sent by the base station.

In an implementable manner, when the UE determines that the average signal strength and/or the signal strength related time ratio meets a time indicated via an event trigger and a periodic trigger, the UE sends the measurement result to the base station.

According to this embodiment of the present invention, the UE measures the average signal strength and the signal strength related time ratio according to the measurement configuration of the unlicensed spectrum cell sent by the base station. If the average signal strength and/or the signal strength related time ratio satisfies the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station determines to configure the unlicensed spectrum cell for the UE, the unlicensed spectrum cell can provide a service for the UE.

Referring to FIG. 4, FIG. 4 is a schematic flowchart of an embodiment of a method for controlling a DRX timer to count according to certain embodiments of the present invention. This embodiment provides detailed descriptions about how UE identifies that a subframe sent by a base station in a licensed spectrum cell and an unlicensed spectrum cell is a PDCCH-subframe when the UE communicates with the base station in a carrier aggregation cell (that is, a cell obtained after carrier aggregation is performed on the unlicensed spectrum cell and the licensed spectrum cell).

In the embodiments of the present invention, the embodiment of FIG. 4 may be based on the embodiments of FIG. 1 and FIG. 2. On the basis that the base station determines the unlicensed spectrum cell in which the base station can communicate with the UE (that is, after step S101 in the embodiment of FIG. 1 or step S202 in the embodiment of FIG. 2), the UE obtains a PDCCH-subframe from the licensed spectrum cell and the unlicensed spectrum cell on which carrier aggregation is performed.

It should be noted that if the carrier aggregation cell uses an FDD standard, all downlink subframes sent by the base station in the carrier aggregation cell may be defined as a PDCCH-subframe. If not all carrier aggregation cells use the FDD standard, there are two cases. One case is that all the carrier aggregation cells use a TDD standard, and the other case is that some carrier aggregation cells use the TDD standard and some carrier aggregation cells use the FDD standard. In the two cases, if the UE cannot simultaneously receive and send messages in the carrier aggregation cells, the UE relies on a SPCell (special cell). If a subframe sent by the base station in the SPCell is a downlink subframe, the subframe sent by the base station is a PDCCH-subframe. The SPCell is a PCell (primary cell) or a PSCell (primary secondary cell). If the UE can simultaneously receive and send messages in the carrier aggregation cell, provided that a subframe of any cell is a downlink subframe, including a part of a subframe of the unlicensed spectrum cell (duration of the part of the subframe is shorter than duration of a subframe of the licensed spectrum cell), the subframe may be determined as a PDCCH-subframe. However, a cell on which cross-carrier scheduling is performed needs to be excluded in this case. For example, all of a PCell, a SCell1, a SCell2, and a SCell3 are serving cells for carrier aggregation performed by the UE. If the SCell2 is used to perform cross-carrier scheduling on the SCell3, subframes of the SCell3 need to be excluded when a PDCCH-subframe is being determined.

In this embodiment, the unlicensed spectrum cell is set as a SCell (secondary cell), and the licensed spectrum cell is set as a PCell. Detailed descriptions are provided on the premise that the UE related to this embodiment can simultaneously receive and send messages in a carrier aggregation cell.

As shown in FIG. 4, another embodiment of the method for controlling a DRX timer to count according to certain embodiments of the present invention may include the following operations.

In operation S400, user equipment obtains a subframe K1 of a licensed spectrum cell and a subframe K2 of an unlicensed spectrum cell, where the subframe K2 includes a subframe K3, and duration of K3 is shorter than a duration of subframe K1.

In one embodiment, the UE may receive the subframe K1 of the licensed spectrum cell and the subframe K2 of the unlicensed spectrum cell that are sent by the base station, or the UE may obtain the subframe K1 of the licensed spectrum cell and the subframe K2 of the unlicensed spectrum cell by listening on a physical channel, for example, a PDCCH, of a carrier aggregation cell.

Figure 5:
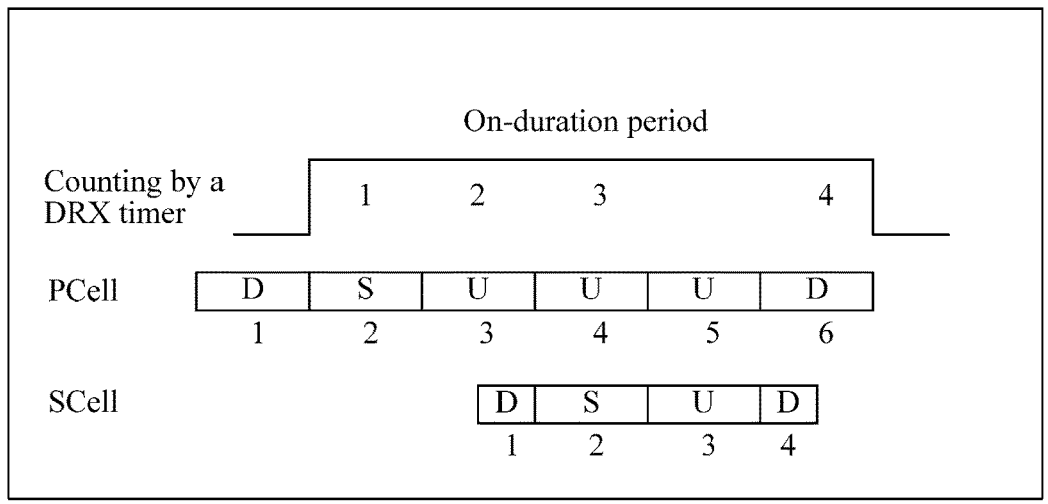
FIG. 5 is a schematic diagram of a DRX timer being in an on-duration period in a method for controlling a discontinuous reception DRX timer to count according to the embodiments of the present invention.

In one embodiment, as shown in FIG. 5, a PCell is the licensed spectrum cell, and a SCell is the unlicensed spectrum cell. In the TDD standard, different uplink-downlink configuration modes may be configured for the PCell and the SCell according to service types of the PCell and the Scell respectively, so as to meet uplink-downlink asymmetric service requirements. In this embodiment, a configuration mode of the PCell may be set to Mode 0, that is, DSUUU DSUUU, and a configuration mode of the SCell may be set to Mode 5, that is, DSUDD DDDDD. "D" indicates a downlink subframe, "S" indicates a special subframe, and "U" indicates an uplink subframe. The special subframe may include a subframe for uplink transmission or downlink transmission by means of time division. The UE obtains, in the carrier aggregation cell, the subframe K1 of the licensed spectrum cell and the subframe K2 of the unlicensed spectrum cell, and the subframe K2 of the unlicensed spectrum cell includes the subframe K3, such as the first subframe of the SCell shown in FIG. 5. Because the base station performs listen before talk (Listen Before Talk, listen before talk) before sending a subframe in the unlicensed spectrum cell, duration of the first subframe is shorter than the duration of K1. Therefore, the first subframe of the SCell is the subframe K3. In this case, the subframe start time of the subframe K3 may start from the $0^{th}$ or seventh OFDM (Orthogonal Frequency Division Multiplexing, orthogonal frequency division multiplexing) symbol (symbol #0 or symbol #7) of the subframe K2.

In one embodiment, the configuration mode of the PCell or the SCell in the TDD standard may be any one of the following:

Mode 0: DSUUU DSUUU;
Mode 1: DSUUD DSUUD;
Mode 2: DSUDD DSUDD;
Mode 3: DSUUU DDDDD;
Mode 4: DSUUD DDDDD;
Mode 5: DSUDD DDDDD; or
Mode 6: DSUUU DSUUD.

It should be noted that the configuration mode used by the PCell or the SCell is not limited in this embodiment.

In operation S401, the user equipment determines, in the subframe K1 and the subframe K2, a subframe satisfying a preset condition as a physical downlink control channel PDCCH-subframe, where the PDCCH-subframe includes subframe K1 and/or subframe K2.

In one embodiment, because the UE in this embodiment can simultaneously receive and send messages in the carrier aggregation cell, the preset condition is: Provided that a subframe of any cell is a downlink subframe, the subframe may be determined as the PDCCH-subframe. Therefore, the user equipment may determine, in the subframe K1 and the subframe K2, the subframe satisfying the preset condition as the PDCCH-subframe.

In an implementable manner, if a special subframe exists in the subframe K1 and the subframe K2, because the special subframe includes a subframe for uplink transmission or downlink transmission by means of the TDD standard, the special subframe may be determined as the PDCCH-subframe.

In operation S402, the user equipment controls, based on the PDCCH-subframe, a DRX timer to count.

In one embodiment, the user equipment controls, according to the determined PDCCH-subframe, the DRX timer to count. Specifically, as shown in FIG. 5, after receiving the first subframe (downlink subframe) of the Pcell, the UE enables the DRX timer. Therefore, the DRX timer enters an on-duration period (On-Duration Timer). In this case, a counting result on the DRX timer is 0. When the second subframe of the PCell is received, because the second subframe of the PCell is a special subframe, the second subframe of the PCell is designated as a PDCCH-subframe, and the DRX timer is controlled to count. In this case, a counting result on the DRX timer is 1. When the UE receives the third subframe of the PCell, the UE correspondingly receives the first subframe of the SCell. The first subframe of the SCell is the subframe K3, and the duration of the subframe K3 is shorter than the duration of subframe K1. Although the third subframe of the PCell is an uplink subframe, because the subframe K3 is a downlink subframe, the subframe K3 is designated as a PDCCH-subframe. Therefore, the UE controls the DRX timer to count, and a counting result on the DRX timer is 2 in this case. When the UE receives the fourth subframe of the PCell, the UE correspondingly receives the second subframe of the SCell. Although the fourth subframe of the PCell is an uplink subframe, because the second subframe of the SCell is a special subframe, the UE also determines the second subframe of the SCell as a PDCCH-subframe. The UE controls the DRX timer to count, and a counting result on the DRX timer is 3 in this case. When the UE receives the fifth subframe of the PCell, the UE correspondingly receives the third subframe of the SCell. Because both of the subframes are uplink subframes, which do not meet the preset condition, the DRX timer does not count. When the UE receives the sixth subframe of the PCell, the UE correspondingly receives the fourth subframe of the SCell, and the fourth subframe of the SCell is also the subframe K3. Because both of the subframes are downlink subframes, the UE designates both subframes as PDCCH-subframes, and controls the DRX timer to count. In this case, a counting result on the DRX timer is 4. After receiving downlink data of the PCell, the UE controls a count process of the DRX timer to end.

According to one embodiment of the present invention, the UE determines, in the received subframe K1 of the licensed spectrum cell and the received subframe K2 of the unlicensed spectrum cell, the subframe satisfying the preset condition as the PDCCH-subframe, where the subframe K2 includes the subframe K3, and the duration of K3 is shorter than the duration of subframe K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing efficiency of identifying downlink data by the UE, and increasing a data transmission rate of the unlicensed spectrum cell. Therefore, the unlicensed spectrum cell can provide a better downlink service for the UE.

Figure 6:
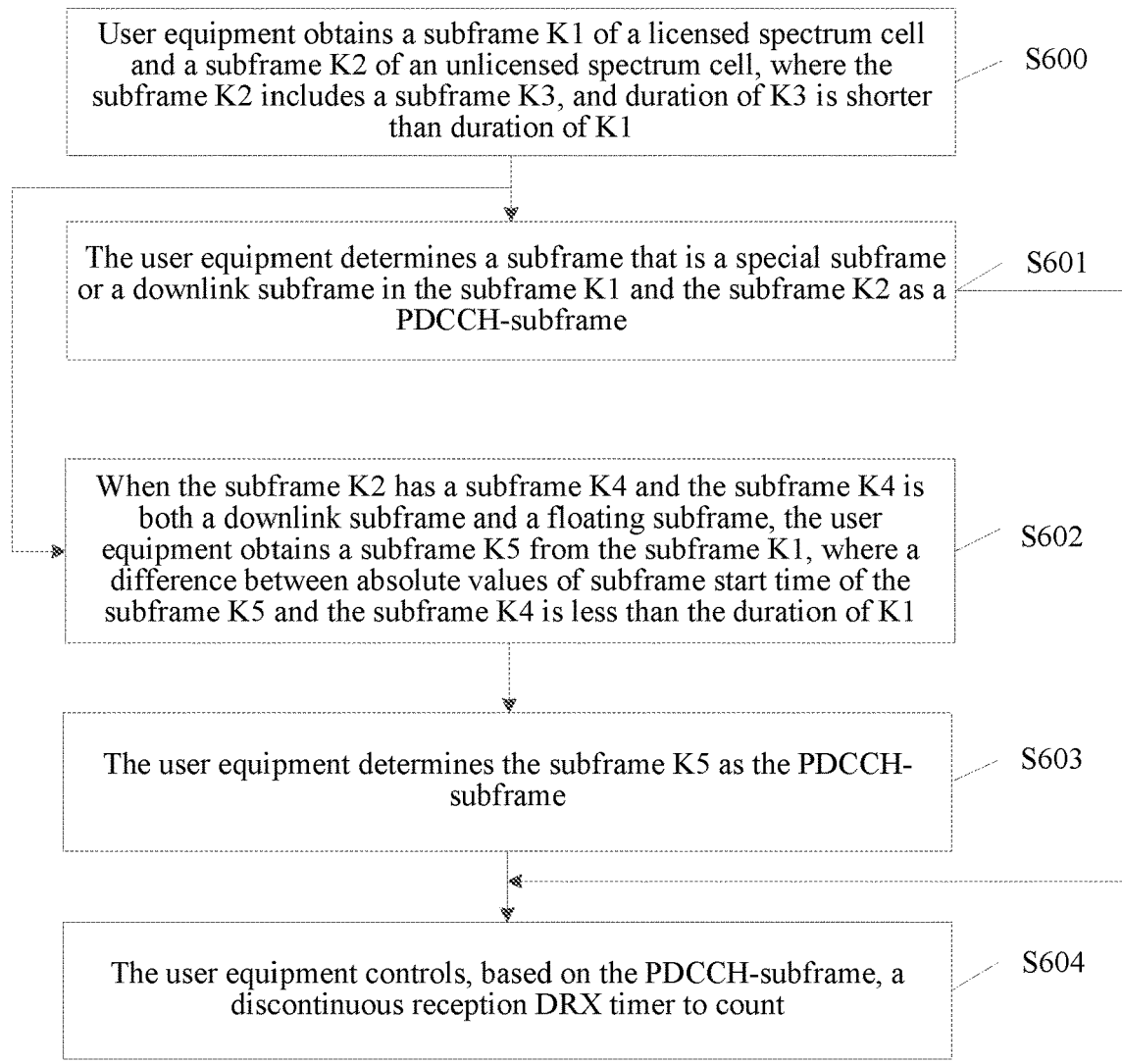
FIG. 6 is a schematic flowchart of another embodiment of a method for controlling a discontinuous reception DRX timer to count according to the embodiments of the present invention.

Referring to FIG. 6, FIG. 6 is a schematic flowchart of another embodiment of a method for controlling a DRX timer to count according to certain embodiments of the present invention. In one embodiment, an unlicensed spectrum cell is set as a SCell, and a licensed spectrum cell is set as a PCell. Detailed descriptions are provided on the premise that the UE related to this embodiment can simultaneously receive and send messages in a carrier aggregation cell.

In one embodiments of the present invention, FIG. 6 may be understood as detailed descriptions for the embodiment of FIG. 5. Alternatively, FIG. 6 may be based on the embodiments of FIG. 1 and FIG. 2. On the basis that the base station determines the unlicensed spectrum cell in which the base station can communicate with the UE (that is, after operation S101 in the embodiment of FIG. 1 or step S202 in the embodiment of FIG. 2), the UE obtains a PDCCH-subframe from the licensed spectrum cell and the unlicensed spectrum cell on which carrier aggregation is performed.

As shown in FIG. 6, another embodiment of the method for controlling a discontinuous reception DRX timer to count according to certain embodiments of the present invention may include the following operations.

In operation S600, user equipment obtains a subframe K1 of a licensed spectrum cell and a subframe K2 of an unlicensed spectrum cell, where the subframe K2 includes a subframe K3, and duration of K3 is shorter than duration of subframe K1.

Figure 7:
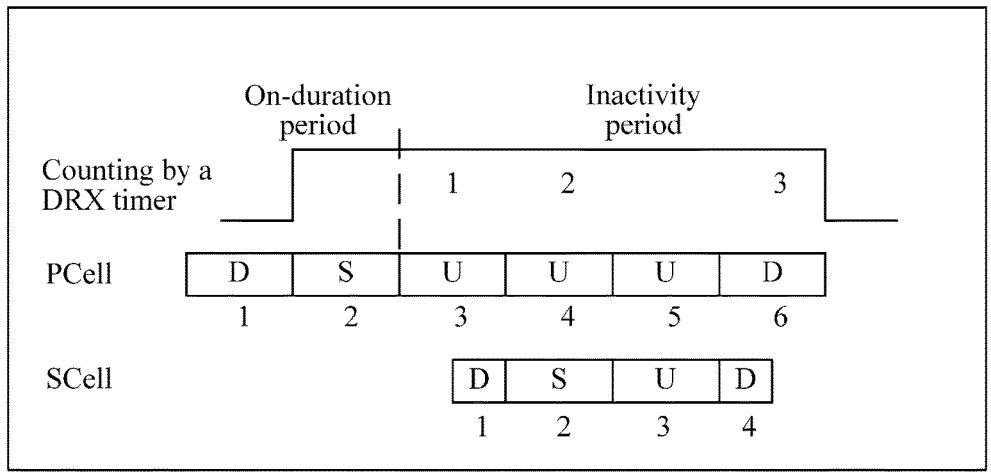
FIG. 7 is a schematic diagram of a DRX timer being in an inactivity period in a method for controlling a discontinuous reception DRX timer to count according to the embodiments of the present invention.
Figure 8:
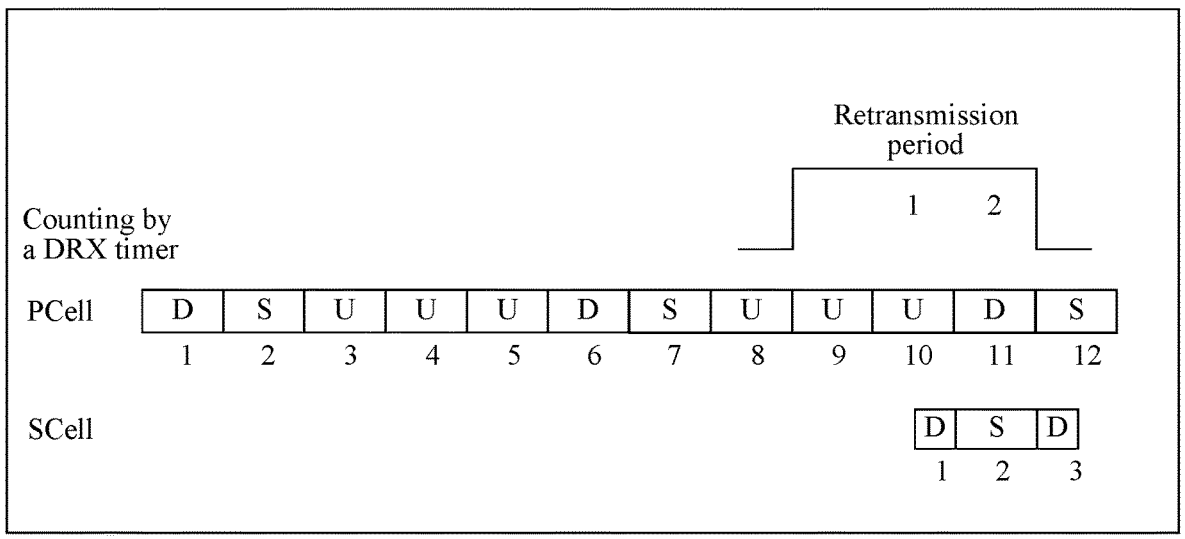
FIG. 8 is a schematic diagram of a DRX timer being in a retransmission period in a method for controlling a discontinuous reception DRX timer to count according to the embodiments of the present invention.

In one embodiment, as shown in FIG. 7 and FIG. 8, the UE obtains, in a carrier aggregation cell, the subframe K1 of the licensed spectrum cell and the subframe K2 of the unlicensed spectrum cell, the subframe K2 of the unlicensed spectrum cell includes the subframe K3, and the duration of the subframe K3 is shorter than the duration of the subframe K1. The UE may receive the subframe K1 of the licensed spectrum cell and the subframe K2 of the unlicensed spectrum cell that are sent by the base station, or the UE may obtain the subframe K1 of the licensed spectrum cell and the subframe K2 of the unlicensed spectrum cell by listening on a physical channel of the carrier aggregation cell.

In operation S601, the user equipment determines a subframe that is a special subframe or a downlink subframe in the subframe K1 and the subframe K2 as the PDCCH-subframe.

In one embodiment, the special subframe includes a subframe for uplink transmission or downlink transmission by means of time division. As shown in FIG. 7, FIG. 7 shows a case of controlling, by the UE, a DRX timer to enter an inactivity period (DRX-Inactivity Timer) to count. Similar to the rule of determining the PDCCH-subframe in the embodiment of FIG. 4, after the DRX timer enters the inactivity period, if any one of the subframe K1, the subframe K2, or the subframe K3 is a special subframe or a downlink subframe, the subframe is determined as a PDCCH-subframe.

Similarly, as shown in FIG. 8, FIG. 8 shows a case of controlling, by the UE, the DRX timer to enter a retransmission period (DRX-Retransmission Timer) to count. If the UE receives downlink data in the first subframe of a PCell but fails to decode the downlink data, the UE may choose to require the base station to retransmit data in the fifth subframe of the PCell (the fifth subframe is an uplink subframe). The UE may enable the DRX timer in the ninth subframe of the PCell, so that the DRX timer enters the retransmission period. Similar to the rule of determining the PDCCH-subframe in the embodiment of FIG. 4, after the DRX timer enters the retransmission period, if any one of the subframe K1, the subframe K2, or the subframe K3 is a special subframe or a downlink subframe, the subframe is determined as a PDCCH-subframe.

In operation S602, when the subframe K2 includes a subframe K4 and the subframe K4 is both a downlink subframe and a floating subframe, the user equipment obtains a subframe K5 from the subframe K1, where a difference between absolute values of subframe start time of the subframe K5 and the subframe K4 is less than the duration of subframe K1.

Figure 9:
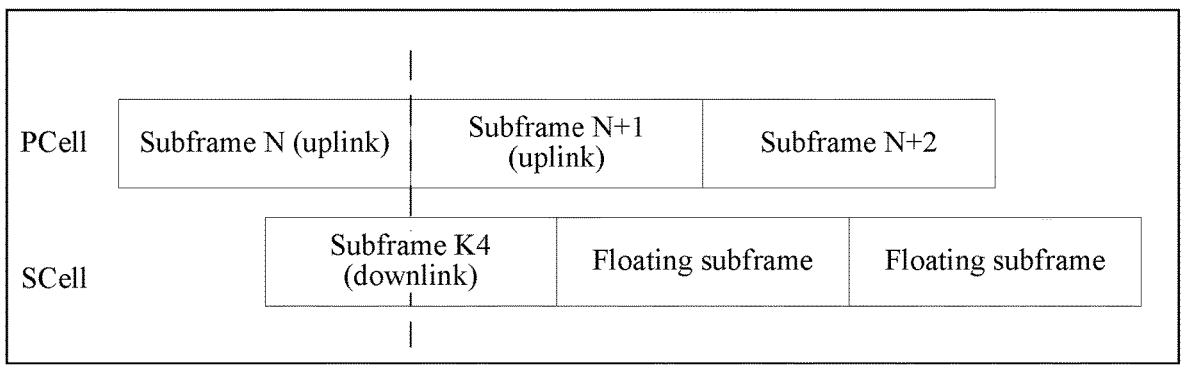
FIG. 9 is a schematic diagram of a frame structure including a floating subframe in an unlicensed spectrum cell in a method for controlling a discontinuous reception DRX timer to count according to the embodiments of the present invention.

In one embodiment, the duration of the floating subframe is equal to the duration of K1, and subframe start time of the floating subframe is selectively aligned with subframe start time of K1. The floating subframe belongs to the unlicensed spectrum cell, and the subframe start time of the floating subframe is not compulsorily aligned with the subframe start time of the subframe K1. Therefore, a subframe end time of the floating subframe is not compulsorily aligned with a subframe end time of the subframe K1 either. As shown in FIG. 9, when the UE obtains a floating subframe (for example, the subframe K4) in a SCell and the floating subframe is a downlink subframe, the UE obtains the subframe K5 in the PCell. The difference between the absolute values of the subframe start time of the subframe K5 and the subframe K4 is less than the duration of K1. As shown in FIG. 9, a subframe meeting the subframe K5 may be a subframe N and a subframe N+1 in the PCell.

In operation S603, the user equipment determines the subframe K5 as the PDCCH-subframe.

In one embodiment, the UE may determine at least one of the subframe N or the subframe N+1 as a PDCCH-subframe. For example, the UE may determine the subframe N as a PDCCH-subframe, the subframe N+1 as a PDCCH-subframe, and the subframe N and the subframe N+1 as PDCCH-subframes.

In operation S604, the user equipment controls, based on the PDCCH-subframe, a DRX timer to count.

Figure 10:
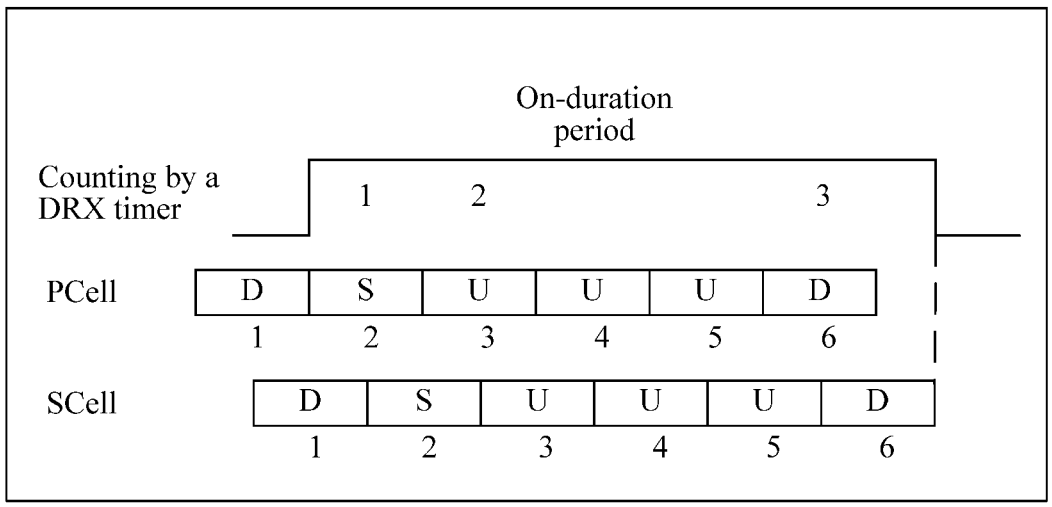
FIG. 10 is a schematic diagram of counting, by a DRX timer, a frame structure including a floating subframe in a method for controlling a discontinuous reception DRX timer to count according to the embodiments of the present invention.

In one embodiment, as shown in FIG. 7, when receiving a downlink subframe of the PCell during the inactivity period of the DRX timer, the UE controls the DRX timer to stop counting. Therefore, a counting result on the DRX timer shown in FIG. 7 is 3. As shown in FIG. 8, when the UE receives a downlink subframe of the PCell during the retransmission period of the DRX timer, it indicates that the base station retransmits data. In this case, the UE controls the DRX timer to stop counting. Therefore, a counting result on the DRX timer shown in FIG. 8 is 2. As shown in FIG. 10, when a subframe of the SCell obtained by the UE during the on-duration period of the DRX timer includes a floating subframe, the UE may control, based on the subframe N and the subframe N+1 being PDCCH-subframes, the DRX timer to count. Therefore, a counting result on the DRX timer shown in FIG. 10 is 3, and the DRX timer stops counting after the last subframe of the SCell ends.

Figure 11:
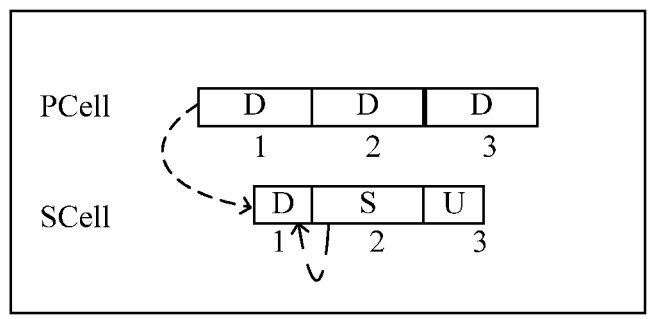
FIG. 11 is a schematic diagram of subframe scheduling in a method for controlling a discontinuous reception DRX timer to count according to the embodiments of the present invention.

In one embodiment, as shown in FIG. 11, when receiving the first downlink subframe (data in the first downlink subframe is data transmitted by the base station for the first time) transmitted by the base station in the SCell, the UE may use a PDCCH in the first downlink subframe of the PCell to indicate the data of the first downlink subframe (the downlink subframe is the subframe K3) of the SCell, to implement cross-carrier scheduling, or the UE may use a PDCCH in a next subframe (the next subframe needs to be a special subframe or a downlink subframe) of the first downlink subframe of the SCell to forward indicate data of the first downlink subframe.

Figure 12:
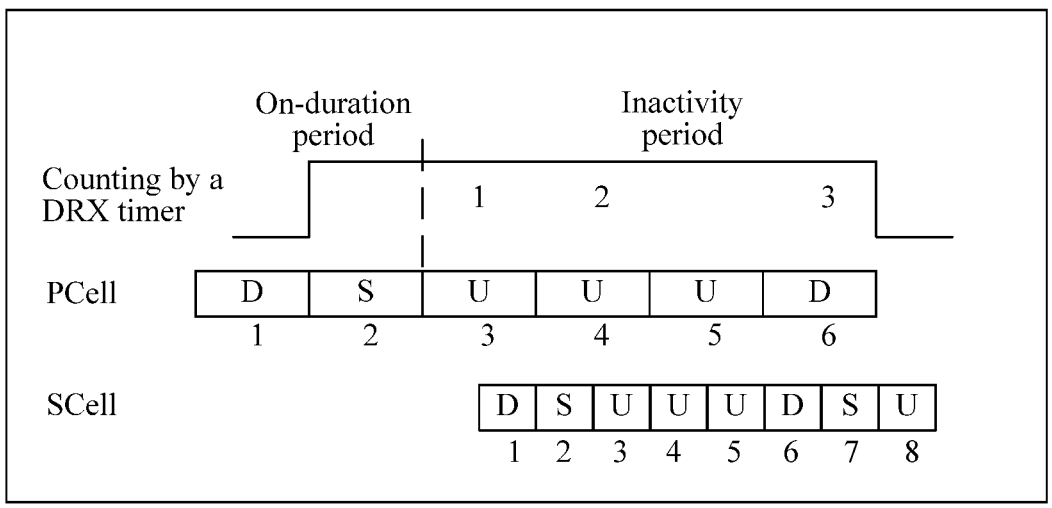
FIG. 12 is a schematic diagram of a TTI frame structure in a method for controlling a discontinuous reception DRX timer to count according to the embodiments of the present invention.

Optionally, as shown in FIG. 12, if the subframe K2 that is transmitted by the base station in the SCell and that is received by the UE is a subframe with a short TTI (transmission time interval), the subframe K2 may be equivalent to the subframe K3 (that is, when the subframe K2 is a subframe with a short TTI, duration of the subframe K2 may be equal to the duration of the subframe K3). The duration of the subframe with the short TTI used by the SCell may be 0.5 ms, and the duration of the subframe K1 of the PCell may be 1 ms. In FIG. 12, both the PCell and the SCell use Configuration Mode 0, that is, DSUUU DSUUU, in the TDD standard. However, configuration modes used by the PCell and the SCell are not limited in this embodiment.

Optionally, duration of the PDCCH-subframe may be configured by the base station, and the duration of the PDCCH-subframe may be equal to the duration of K1, or may be equal to the duration of K2. Alternatively, duration of the PDCCH-subframe may be specified in a communications standard, and it may be specified that the duration of the PDCCH-subframe is equal to the duration of K1, or is equal to the duration of K2. For example, the duration of the PDCCH-subframe is equal to the duration of K1. If the duration of K2 is shorter than that of K1, the user equipment determines, based on the duration of K1, K2 as the PDCCH-subframe. For another example, the duration of the PDCCH-subframe is equal to the duration of K2. If the duration of K2 is shorter than that of K1, when the user equipment determines K1 as the PDCCH-subframe, a quantity of PDCCH-subframes is a ratio of the duration of K1 to the duration of K2. Then, the DRX timer performs counting according to the quantity of the PDCCH-subframes.

According to one embodiment of the present invention, the UE determines, in the received subframe K1 of the licensed spectrum cell and the received subframe K2 of the unlicensed spectrum cell, the subframe satisfying the preset condition as the PDCCH-subframe, where the subframe K2 includes the subframe K3, and the duration of K3 is shorter than the duration of K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing efficiency of identifying downlink data by the UE, and increasing a data transmission rate of the unlicensed spectrum cell. Therefore, the unlicensed spectrum cell can provide a better downlink service for the UE.

Figure 13:
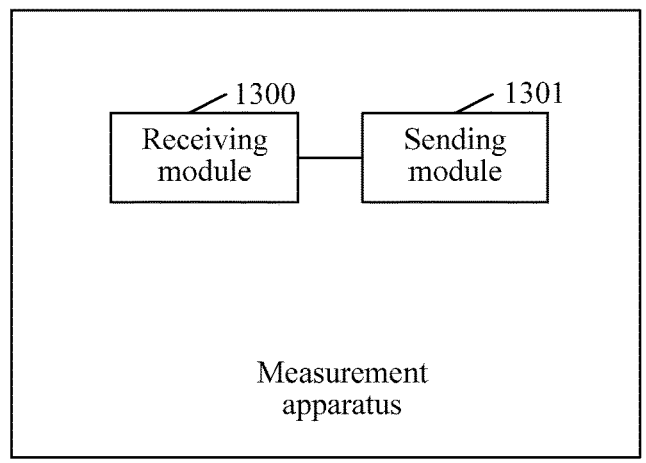
FIG. 13 is a schematic structural diagram of a measurement apparatus according to the embodiments of the present invention.

Referring to FIG. 13, FIG. 13 is a schematic structural diagram of a measurement apparatus according to an embodiment of the present invention. For details of specific steps implemented by various modules in this embodiment of the present invention, refer to the embodiments of FIG. 1 and FIG. 2. The measurement apparatus according to this embodiment may be the UE in the embodiments of FIG. 1 and FIG. 2. Details are not described again in this embodiment of the present invention. The measurement apparatus shown in FIG. 13 includes a receiving module 1300 and a sending module 1301.

The receiving module 1300 is configured to receive a measurement configuration of an unlicensed spectrum cell sent by a base station, where the measurement configuration includes a trigger condition, an average signal strength, and a signal strength related time ratio.

The sending module 1301 is configured to send a measurement result of the average signal strength and the signal strength related time ratio to the base station when at least one of the average signal strength or the signal strength related time ratio meets the trigger condition.

In one embodiment, the measurement configuration further includes a discovery signal measurement timing configuration DMTC, and the measurement result further includes a time window ratio. The measurement apparatus further includes an obtaining module (not shown in the figure).

The obtaining module (not shown in the figure) is configured to obtain the time window ratio.

The time window ratio is a ratio of a quantity of DMTCs measured by the measurement apparatus for which a discovery reference signal DRS of the unlicensed spectrum cell is obtained to a quantity of the DMTCs measured by the measurement apparatus.

In one embodiment, the trigger condition includes at least one of the following:

a signal quality of the unlicensed spectrum cell is greater than a first signal quality threshold;

a signal quality of the unlicensed spectrum cell is less than a second signal quality threshold;

a signal quality of a neighboring cell is greater than a third signal quality threshold;

a signal quality of the neighboring cell is greater than a signal quality of the unlicensed spectrum cell, and a difference between the signal quality of the neighboring cell and the signal quality of the unlicensed spectrum cell is greater than a fourth signal quality threshold;

a channel resource quality of the unlicensed spectrum cell is greater than a first channel resource quality threshold; or a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

In one embodiment, the average signal strength is an average value of signal strengths of the unlicensed spectrum cell that are measured by the measurement apparatus.

The signal strength related time ratio is a ratio of a total time corresponding to signal strengths that are greater than or equal to a first strength threshold to a measurement time of the measurement apparatus for the unlicensed spectrum cell.

According to one embodiment of the present invention, the UE measures the average signal strength and the signal strength related time ratio according to the measurement configuration of the unlicensed spectrum cell sent by the base station. If the average signal strength and/or the signal strength related time ratio satisfies the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station determines to configure the unlicensed spectrum cell for the UE, the unlicensed spectrum cell can provide a service for the UE.

Figure 14:
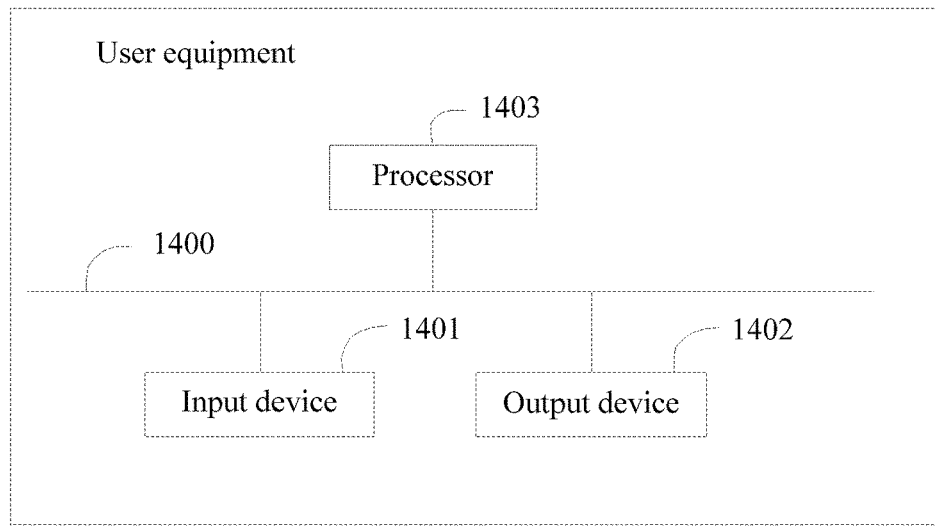
FIG. 14 is a schematic structural diagram of user equipment according to the embodiments of the present invention.

Referring to FIG. 14, FIG. 14 is a schematic structural diagram of user equipment according to an embodiment of the present invention. For details of specific steps implemented by various modules in this embodiment of the present invention, refer to the embodiments of FIG. 1 and FIG. 2. The measurement apparatus according to this embodiment may be the UE in the embodiments of FIG. 1 and FIG. 2. Details are not described again in this embodiment of the present invention. As shown in FIG. 14, the user equipment in this embodiment includes a communications bus 1400, an input device 1401, an output device 1402, and a processor 1403 (the user equipment may include one or more processors 1403, and one processor is used as an example in FIG. 14).

The communications bus 1400 is configured to implement a connection and communication between the input device 1401, the output device 1402, and the processor 1403.

The input device 1401 is configured to receive a measurement configuration of an unlicensed spectrum cell sent by a base station, where the measurement configuration includes a trigger condition, an average signal strength, and a signal strength related time ratio.

The output device 1402 is configured to send a measurement result of the average signal strength and the signal strength related time ratio to the base station when at least one of the average signal strength or the signal strength related time ratio meets the trigger condition.

In one embodiment, the measurement configuration further includes a discovery signal measurement timing configuration DMTC, and the measurement result further includes a time window ratio. The processor 1403 is configured to obtain the time window ratio.

The time window ratio is a ratio of a quantity of DMTCs measured by the processor 1403 for which a discovery reference signal DRS of the unlicensed spectrum cell is obtained to a quantity of the DMTCs measured by the processor 1403.

In one embodiment, the trigger condition includes at least one of the following:

a signal quality of the unlicensed spectrum cell is greater than a first signal quality threshold;

a signal quality of the unlicensed spectrum cell is less than a second signal quality threshold;

a signal quality of a neighboring cell is greater than a third signal quality threshold;

a signal quality of the neighboring cell is greater than a signal quality of the unlicensed spectrum cell, and a difference between the signal quality of the neighboring cell and the signal quality of the unlicensed spectrum cell is greater than a fourth signal quality threshold;

a channel resource quality of the unlicensed spectrum cell is greater than a first channel resource quality threshold; or a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

In one embodiment, the average signal strength is an average value of signal strengths of the unlicensed spectrum cell that are measured by the processor 1403.

The signal strength related time ratio is a ratio of a total time corresponding to signal strengths that are greater than or equal to a first strength threshold to a measurement time of the processor 1403 for the unlicensed spectrum cell.

According to one embodiment of the present invention, the UE measures the average signal strength and the signal strength related time ratio according to the measurement configuration of the unlicensed spectrum cell sent by the base station. If the average signal strength and/or the signal strength related time ratio satisfies the trigger condition, the UE sends the measurement result of the average signal strength and the signal strength related time ratio of the unlicensed spectrum cell to the base station, so that the base station learns a channel quality of the unlicensed spectrum cell according to the received measurement result, thereby determining whether to configure the unlicensed spectrum cell for the UE. When the base station determines to configure the unlicensed spectrum cell for the UE, the unlicensed spectrum cell can provide a service for the UE.

Figure 15:
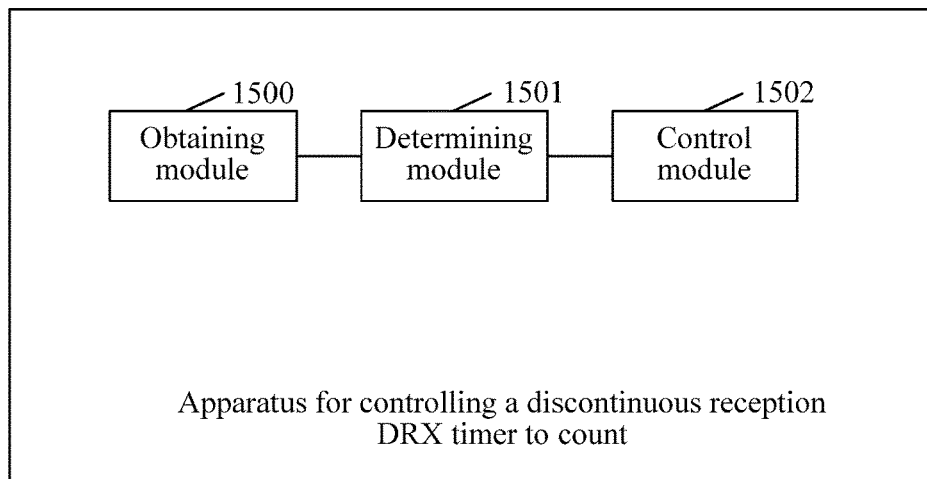
FIG. 15 is a schematic structural diagram of an apparatus for controlling a discontinuous reception DRX timer to count according to the embodiments of the present invention.

Referring to FIG. 15, FIG. 15 is a schematic structural diagram of an apparatus for controlling a DRX timer to count according to an embodiment of the present invention. For details of specific steps implemented by various modules in this embodiment of the present invention, refer to the embodiments of FIG. 4 to FIG. 6. The measurement apparatus according to this embodiment may be the UE in the embodiments of FIG. 4 and FIG. 6. Details are not described again in this embodiment of the present invention. The apparatus in this embodiment of the present invention includes an obtaining module 1500, a determining module 1501, and a control module 1502.

The obtaining module 1500 is configured to obtain a subframe K1 of a licensed spectrum cell and a subframe K2 of an unlicensed spectrum cell, where the subframe K2 includes a subframe K3, and duration of K3 is shorter than duration of K1.

The determining module 1501 is configured to determine, in the subframe K1 and the subframe K2 obtained by the obtaining module 1500, a subframe meeting a preset condition as a physical downlink control channel PDCCH-subframe, where the PDCCH-subframe includes subframe K1 and/or subframe K2.

The control module 1502 is configured to control, based on the PDCCH-subframe determined by the determining module 1501, a DRX timer to count.

In an implementable manner, the determining module 1501 is specifically configured to:

determine a subframe that is a special subframe or a downlink subframe in the subframe K1 and the subframe K2 as the PDCCH-subframe.

The special subframe includes a subframe for uplink transmission or downlink transmission by means of time division.

In one embodiment, the obtaining module 1500 is specifically configured to:

when the subframe K2 has a subframe K4 and the subframe K4 is both a downlink subframe and a floating subframe, obtain a subframe K5 from the subframe K1, where a difference between absolute values of subframe start time of the subframe K5 and the subframe K4 is less than the duration of subframe K1.

The determining module 1501 is specifically configured to:

designate the subframe K5 as the PDCCH-subframe.

In one embodiment, duration of the floating subframe is equal to the duration of K1, and subframe start time of the floating subframe is selectively aligned with subframe start time of K1.

According to one embodiment of the present invention, the UE determines, in the received subframe K1 of the licensed spectrum cell and the received subframe K2 of the unlicensed spectrum cell, the subframe satisfying the preset condition as the PDCCH-subframe, where the subframe K2 includes the subframe K3, and the duration of K3 is shorter than the duration of K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing efficiency of identifying downlink data by the UE, and increasing a data transmission rate of the unlicensed spectrum cell. Therefore, the unlicensed spectrum cell can provide a better downlink service for the UE.

Figure 16:
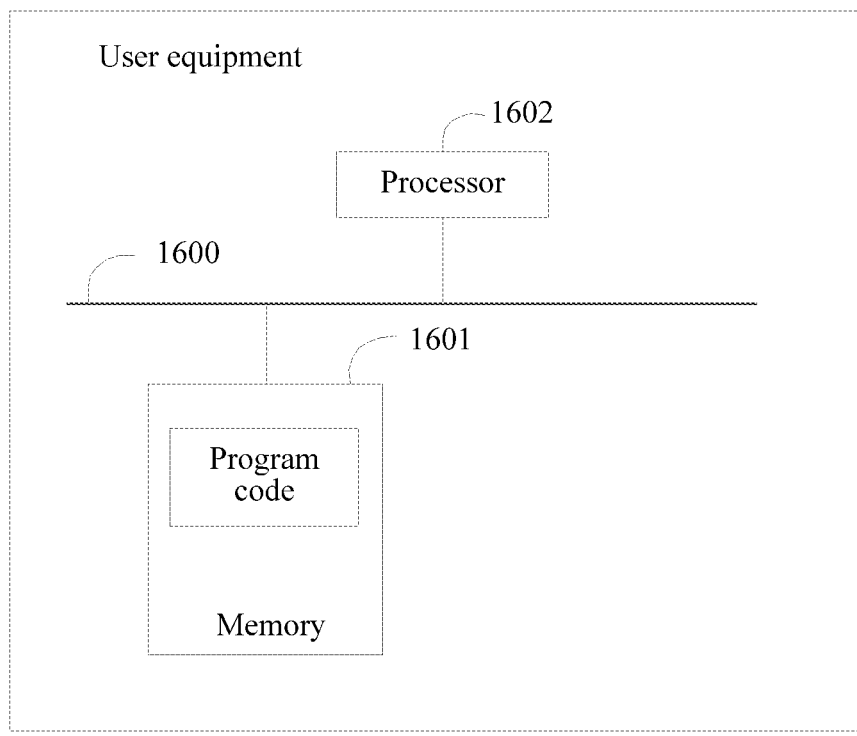
FIG. 16 is a schematic structural diagram of another user equipment according to the embodiments of the present invention.

Referring to FIG. 16, FIG. 16 is a schematic structural diagram of user equipment according to another embodiment of the present invention. For details of specific steps implemented by various modules in this embodiment of the present invention, refer to the embodiments of FIG. 4 to FIG. 6. The measurement apparatus according to this embodiment may be the UE in the embodiments of FIG. 4 and FIG. 6. Details are not described again in this embodiment of the present invention. As shown in FIG. 14, the user equipment in this embodiment includes a communications bus 1600, a memory 1601, and a processor 1602 (the user equipment may include one or more processors 1602, and one processor is used as an example in FIG. 16).

The communications bus 1600 is configured to implement a connection and communication between the memory 1601 and the processor 1602.

The memory 1601 stores a set of program code, and the processor 1602 invokes the program code stored in the memory 1601 to perform the following operations:

obtaining a subframe K1 of a licensed spectrum cell and a subframe K2 of an unlicensed spectrum cell, where the subframe K2 includes a subframe K3, and duration of subframe K3 is shorter than duration of subframe K1;

determining, in the subframe K1 and the subframe K2, a subframe meeting a preset condition as a physical downlink control channel PDCCH-subframe, where the PDCCH-subframe includes subframe K1 and/or subframe K2; and controlling, based on the PDCCH-subframe, a DRX timer to count.

In one embodiment, when performing the determining, in the subframe K1 and the subframe K2, a subframe meeting a preset condition as a physical downlink control channel PDCCH-subframe, the processor 1602 is specifically configured to:

determine a subframe that is a special subframe or a downlink subframe in the subframe K1 and the subframe K2 as the PDCCH-subframe.

The special subframe includes a subframe for uplink transmission or downlink transmission by means of time division.

In one embodiment, when performing the determining, in the subframe K1 and the subframe K2, a subframe meeting a preset condition as a physical downlink control channel PDCCH-subframe, the processor 1602 is specifically configured to:

when the subframe K2 has a subframe K4 and the subframe K4 is both a downlink subframe and a floating subframe, obtain a subframe K5 from the subframe K1, where a difference between absolute values of subframe start time of the subframe K5 and the subframe K4 is less than the duration of subframe K1; and designate the subframe K5 as the PDCCH-subframe.

In one embodiment, duration of the floating subframe is equal to the duration of K1, and subframe start time of the floating subframe is selectively aligned with subframe start time of K1.

According to one embodiment of the present invention, the UE determines, in the received subframe K1 of the licensed spectrum cell and the received subframe K2 of the unlicensed spectrum cell, the subframe satisfying the preset condition as the PDCCH-subframe, where the subframe K2 includes the subframe K3, and the duration of K3 is shorter than the duration of K1; and controls, based on the PDCCH-subframe, the DRX timer to count. This can identify the PDCCH-subframe from the subframe K1 and the subframe K2 according to the preset condition, and increase a probability of identifying the PDCCH-subframe, thereby increasing efficiency of identifying downlink data by the UE, and increasing a data transmission rate of the unlicensed spectrum cell. Therefore, the unlicensed spectrum cell can provide a better downlink service for the UE.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention include a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A measurement result reporting method, comprising:
receiving, by user equipment, a measurement configuration of an unlicensed spectrum cell sent by a base station, wherein the measurement configuration comprises a trigger condition, an average signal strength, a signal strength related time ratio, and a discovery signal measurement timing configuration (DMTC);
obtaining, by the user equipment, a time window ratio, wherein the time window ratio equals $N_{DMTC\_valid}/N_{DMTC}$, where $N_{DMTC\_valid}$ is a quantity of DMTCs measured by the user equipment for which a discovery reference signal (DRS) of the unlicensed spectrum cell is obtained, and $N_{DMTC}$ is a quantity of the DMTCs measured by the user equipment; and
sending, by the user equipment, a measurement result of the average signal strength, the signal strength related time ratio, and the time window ratio to the base station when at least one of the average signal strength or the signal strength related time ratio satisfies the trigger condition.

2. The method according to claim 1, wherein the trigger condition comprises at least one of the following:
a signal quality of the unlicensed spectrum cell is greater than a first signal quality threshold;
a signal quality of the unlicensed spectrum cell is less than a second signal quality threshold;
a signal quality of a neighboring cell is greater than a third signal quality threshold;
a signal quality of a neighboring cell is greater than a signal quality of the unlicensed spectrum cell, and a difference between the signal quality of the neighboring cell and the signal quality of the unlicensed spectrum cell is greater than a fourth signal quality threshold;
a channel resource quality of the unlicensed spectrum cell is greater than a first channel resource quality threshold; or
a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

3. The method according to claim 1, wherein
the average signal strength is an average value of signal strengths of the unlicensed spectrum cell that are measured by the user equipment; and
the signal strength related time ratio is a ratio of a total time corresponding to signal strengths that are greater than or equal to a first strength threshold to a measurement time of the user equipment for the unlicensed spectrum cell.

4. A user equipment comprising:
a receiver configured to receive a measurement configuration of an unlicensed spectrum cell sent by a base station, wherein the measurement configuration comprises a trigger condition, an average signal strength, a signal strength related time ratio, and a discovery signal measurement timing configuration (DMTC);
obtain a time window ratio, wherein the time window ratio equals $N_{DMTC\_valid}/N_{DMTC}$, where $N_{DMTC\_valid}$ is a quantity of DMTCs measured by the processor for which a discovery reference signal (DRS) of the unlicensed spectrum cell is obtained, and $N_{DMTC}$ is a quantity of the DMTCs measured by the processor; and
a transmitter configured to send a measurement result of the average signal strength, the signal strength related time ratio, and the time window ratio to the base station when at least one of the average signal strength or the signal strength related time ratio satisfies the trigger condition.

5. The user equipment according to claim 4, wherein the trigger condition comprises at least one of the following:
a signal quality of the unlicensed spectrum cell is greater than a first signal quality threshold;
a signal quality of the unlicensed spectrum cell is less than a second signal quality threshold;
a signal quality of a neighboring cell is greater than a third signal quality threshold;
a signal quality of the neighboring cell is greater than a signal quality of the unlicensed spectrum cell, and a difference between the signal quality of the neighboring cell and the signal quality of the unlicensed spectrum cell is greater than a fourth signal quality threshold;
a channel resource quality of the unlicensed spectrum cell is greater than a first channel resource quality threshold; or
a channel resource quality of the unlicensed spectrum cell is greater than a second channel resource quality threshold, and a difference between the channel resource quality of the unlicensed spectrum cell and the second channel resource quality threshold is greater than a third channel resource quality threshold.

6. The user equipment according to claim 4, wherein
the average signal strength is an average value of signal strengths of the unlicensed spectrum cell that are measured by the processor; and
the signal strength related time ratio is a ratio of a total time corresponding to signal strengths that are greater than or equal to a first strength threshold to a measurement time of the processor for the unlicensed spectrum cell.

* * * * *